United States Patent [19]

Rhoades et al.

[11] Patent Number: 5,797,800
[45] Date of Patent: Aug. 25, 1998

[54] METHOD AND APPARATUS FOR RETAINING A BEARING CUP IN A UNIVERSAL JOINT ASSEMBLY

[75] Inventors: Michael L. Rhoades; James T. Reynolds, both of Toledo, Ohio

[73] Assignee: Dana Corporation, Toledo, Ohio

[21] Appl. No.: 640,534

[22] Filed: May 2, 1996

[51] Int. Cl.$^6$ ............................................. F16D 3/16
[52] U.S. Cl. ............................................. 464/130; 464/128
[58] Field of Search ........................... 464/130, 136, 464/128

[56] References Cited

U.S. PATENT DOCUMENTS

| | | | |
|---|---|---|---|
| 2,992,547 | 7/1961 | Rabson | 464/136 X |
| 3,062,026 | 11/1962 | Pitner. | |
| 3,106,076 | 10/1963 | Bastow | 464/136 X |
| 3,178,907 | 4/1965 | Lyons. | |
| 3,230,617 | 1/1966 | Spiess et al.. | |
| 3,290,754 | 12/1966 | Pitner. | |
| 3,324,681 | 6/1967 | Burns et al.. | |
| 3,701,189 | 10/1972 | Kadono et al.. | |
| 3,721,110 | 3/1973 | Borneman | 464/130 |
| 4,000,628 | 1/1977 | Funatani et al. | 464/130 |
| 4,179,905 | 12/1979 | Schultenkamper | 464/130 |
| 4,540,386 | 9/1985 | Kampf | 464/130 |

Primary Examiner—Donald P. Walsh
Assistant Examiner—Emmanuel M. Marcelo
Attorney, Agent, or Firm—MacMillan, Sobanski & Todd

[57] ABSTRACT

A universal joint assembly includes a cross having a body and at least a pair of outwardly extending opposed trunnions. The trunnions define a trunnion axis. A bearing cup is rotatably mounted on each of the trunnions. A yoke includes a pair of opposed arms wherein each arm has an opening formed therethrough and aligned with the other arm opening to receive one of the bearing cups. Each of the openings defines a cylindrical surface having a cylindrical groove of a predetermined width formed therein. The yoke defines a yoke axis. A snap ring of a predetermined thickness is inserted into each of the grooves to retain the bearing cups on said trunnions. The width of each of the grooves is greater than the thickness of the snap rings to permit the cross to be selectively positioned with respect to the yoke. A staking operation fixes the position of the cross with respect to the yoke so that the cross center of gravity is aligned with the yoke axis.

18 Claims, 3 Drawing Sheets

METHOD AND APPARATUS FOR RETAINING A BEARING CUP IN A UNIVERSAL JOINT ASSEMBLY

BACKGROUND OF THE INVENTION

This invention relates in general to universal joints for vehicle drive train systems. More specifically, this invention relates to a method for retaining bearing cups and centering a cross member about a rotational axis in such a universal joint.

Universal joints are well known devices which provide a driving connection between two members adapted to rotate about non-aligned axes of rotation. Universal joints are widely used between rotatable driveshaft sections in vehicle drive train systems. A typical universal joint structure includes a cross having a central body portion with four cylindrical trunnions extending outwardly therefrom. The trunnions are oriented in a single plane and extend at right angles relative to one another. A hollow cylindrical bearing cup is mounted on the end of each of the trunnions. Needle bearings or similar means are provided between the outer cylindrical surfaces of the trunnions and the inner cylindrical surfaces of the bearing cups to permit relative rotational movement therebetween. The bearing cups which are mounted on a first opposed pair of the trunnions can be connected to a first end yoke secured to an end of a first drive shaft section, while the bearing cups mounted on a second opposed pair of the trunnions can be connected to a second end yoke secured to an end of a second drive shaft section.

A full round end yoke is one type of end yoke which is commonly used with a universal joint. A typical full round end yoke includes a body portion having a pair of opposed yoke arms extending therefrom. Each of the opposed yoke arms has a cylindrical opening formed in the end thereof. The two openings are co-axially aligned with one another, each extending between an outer surface and an inner surface of the associated yoke arm. To assemble the universal joint, two of the opposed trunnions of the universal joint cross (having no bearing cups mounted thereon) are initially inserted within the two openings formed through the yoke arms. Then, the bearing cups are moved axially inwardly through the openings from the outer surface of the yoke arms toward the inner surfaces thereof. In this manner, the bearing cups are installed over the ends of the opposed trunnions in the openings formed through the yoke arms.

In the past, bearing cups have been installed on the ends of the trunnion by moving them axially inwardly until the end surfaces of the bearing cups were flush with the outer surfaces of the yoke arms. In some assemblies, bearing plates were then typically bolted across the flush end surfaces to retain the bearing cups.

Alternatively, the bearing cups have been installed on the ends of the trunnions by moving them axially inwardly until the end surfaces of the bearing cups were slightly recessed below the outer surfaces of the yoke arms. Snap rings were inserted within grooves formed in the bores of the yoke arms to retain the bearing cups in this alternative structure. In some assemblies, a staking operation created deformed portions of the yoke arms to fix the location of the snap rings. In order to center the cross with to the end yoke, it was necessary to hold very close tolerances between the snap rings and grooves. No provision was made for minimizing mass offset of the cross member with respect to the rotational axis of the end yoke.

It is desirable to economically assemble a universal joint so that the mass of its components is centered with respect to the rotational axis of the driveshaft. Such an improved universal joint assembly would minimize the need to balance a driveshaft incorporating the universal joint assembly.

SUMMARY OF THE INVENTION

This invention relates to an improved universal joint assembly and a method of assembling such a universal joint. The improved universal joint assembly includes a groove for receiving a snap ring to retain a bearing cup on a trunnion of a cross member. The width of the groove is sized to provide a predetermined amount of travel of the cross member with respect to a yoke after a snap ring is inserted into the groove. The cross member is centered with respect to the end yoke by aligning the cross member center of gravity with an axis of the end yoke. Once centered, a staking operation forms upset portions in the arm against the snap ring, thereby fixing the cross member with respect to the end yoke and minimizing the need to balance a driveshaft incorporating the universal joint assembly.

In a preferred embodiment, a universal joint assembly includes a cross having a body and at least a pair of outwardly extending opposed trunnions. The trunnions define a trunnion axis. A bearing cup is rotatably mounted on each of the trunnions. A yoke includes a pair of opposed arms wherein each arm has an opening formed therethrough and aligned with the other arm opening to receive one of the bearing cups. Each of the openings defines a cylindrical surface having a cylindrical groove of a predetermined width formed therein. The yoke defines a yoke axis. A snap ring of a predetermined thickness is inserted into each of the grooves to retain the bearing cups on said trunnions. The width of each of the grooves is greater than the thickness of the snap rings to permit the cross to be selectively positioned with respect to the yoke. A staking operation fixes the position of the cross with respect to the yoke so that the cross center of gravity is aligned with the yoke axis.

Various objects and advantages of this invention will become apparent to those skilled in the art from the following detailed description of the preferred embodiments, when read in light of the accompanying drawings.

DETAILED DESCRIPTION OF THE PREFERRED EMBODIMENT

Figure 1:
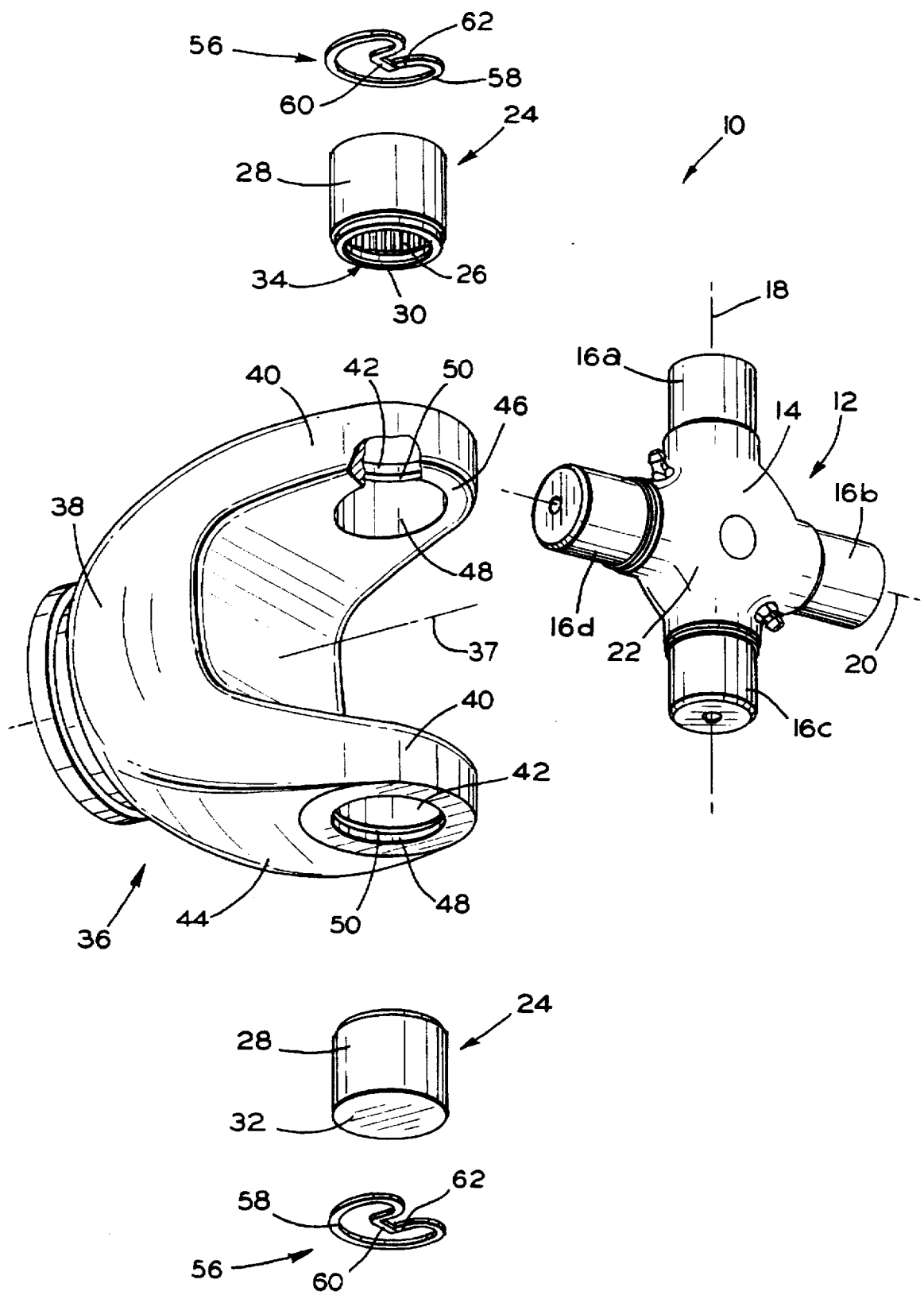
FIG. 1 is an exploded perspective view of a preferred embodiment of a universal joint assembly in accordance with this invention illustrating a full round end yoke, a cross member, bearing cups and snap rings prior to assembly.

Referring now to the drawings, there is illustrated in FIG. 1 a preferred embodiment of a universal joint assembly, indicated generally at 10, in accordance with this invention. The universal joint assembly 10 includes a cross member, indicated generally at 12, having a central body 14 and four cylindrical trunnions 16a, 16b, 16c, 16d extending radially outwardly in a common plane at right angles relative to one another. Trunnions 16a and 16c define a first trunnion axis 18. Trunnions 16b and 16d define a second trunnion axis 20. The universal joint assembly 10 permits pivoting about axes 18 and 20 in a well known manner. Preferably, the cross member 12 has a center of gravity 22 at the intersection of axes 18 and 20.

A bearing cup, indicated generally at 24, is mounted on the end of each of the trunnions 16a–16d. Only one opposed pair of the bearing cups 24 is illustrated in FIG. 1. Needle bearings 26 or similar bearing means are provided between each of the bearing cups 24 and its associated trunnion 16a–16d to permit low friction rotational movement to occur therebetween. Each of the bearing cups 24 is formed generally in the shape of a hollow cylinder having an outer circumferential surface 28, an opened end 30 and a closed end surface 32. A seal and dust guard assembly 34 may be installed on each bearing cup 24 adjacent the opened end 30.

The universal joint assembly 10 further includes a full round end yoke, indicated generally at 36. The full round end yoke 36 is connected to a conventional driveshaft member (not illustrated) and defines an end yoke axis 37. The full round end yoke 36 includes a body portion 38 having a pair of spaced-apart, opposed arms 40 extending therefrom. Each of the opposed arms 40 has a cylindrical opening 42 formed therethrough which extends from an outer arm surface 44 to an inner arm surface 46. The cylindrical opening 42 defines a cylindrical surface 48 between the outer arm surface 44 and the inner arm surface 46. As illustrated best in FIG. 2, a groove 50 having a width W is formed in the cylindrical surface 48. The width W of the groove 50 is defined by an inner wall 52 and an outer wall 54 and described in detail below. When the cross member 12 is assembled to the end yoke 36, two opposed bearing cups 24 are received in the cylindrical openings 42.

Means are provided for retaining the bearing cups 24 within the cylindrical openings 42 of the end yoke 36. A snap ring, indicated generally at 56, is generally a C-shaped member having a central portion 58 terminating in a first leg 60 and a second leg 62. Preferably, a radius of the central portion 58 is slightly larger than the radius of the groove 50. Each snap ring 56 is preferably formed from a suitable resilient material such as spring steel. A snap ring 56 is compressed by its legs 60 and 62 and inserted into each groove 50 to retain the bearing cups 24 within the cylindrical openings 42 and the cross member 12 within the arms 40. When released, the snap ring 56 is retained in the groove 50 by the outer wall 54. The snap ring 56 has a thickness T which is described in detail below.

Figure 3:
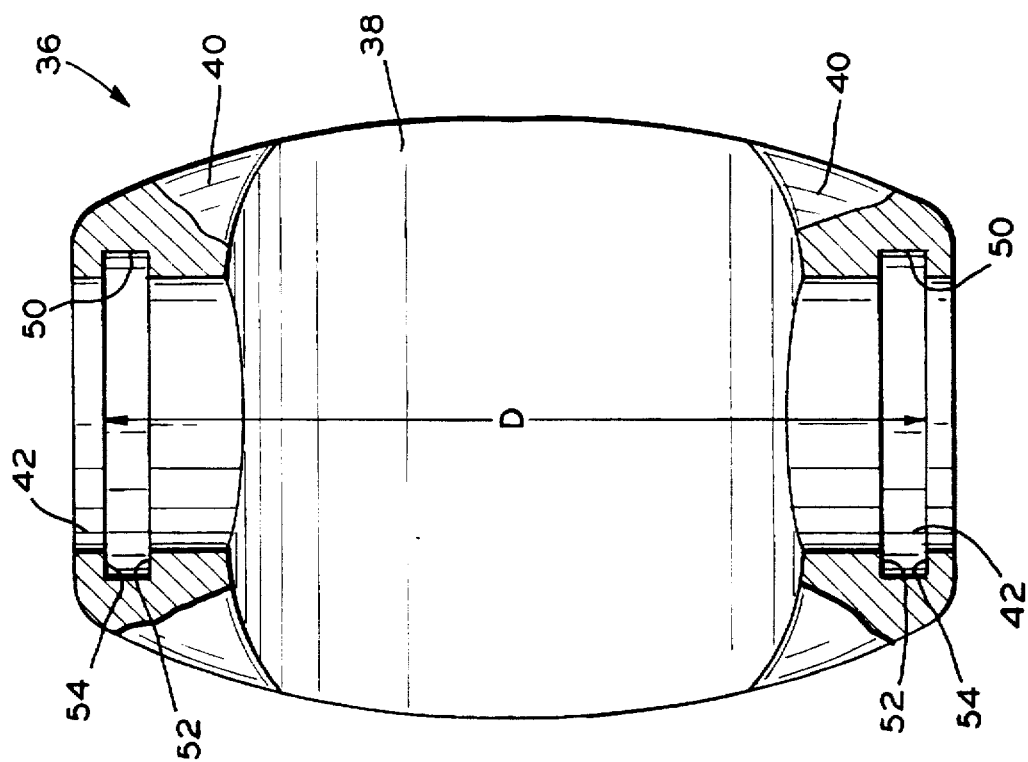
FIG. 3 is an enlarged end elevational view, partly in section, of the end yoke of FIG. 1 wherein the cross member has been removed for clarity of illustration.

A predetermined distance D, illustrated in FIG. 3, is provided between the outer walls 54 of the grooves 50. When compared to the prior art, the distance D has been increased by forming each outer walls 54 farther from the axis 37 of the end yoke 36. In other words, each outer wall 54 has been axially extended from a corresponding inner wall 52, thereby increasing the width W of each groove 50. Preferably, the outer walls 54 are equally extended from their respective inner wall 52. Preferably, the width W of each groove 50 is substantially equal.

Figure 2:
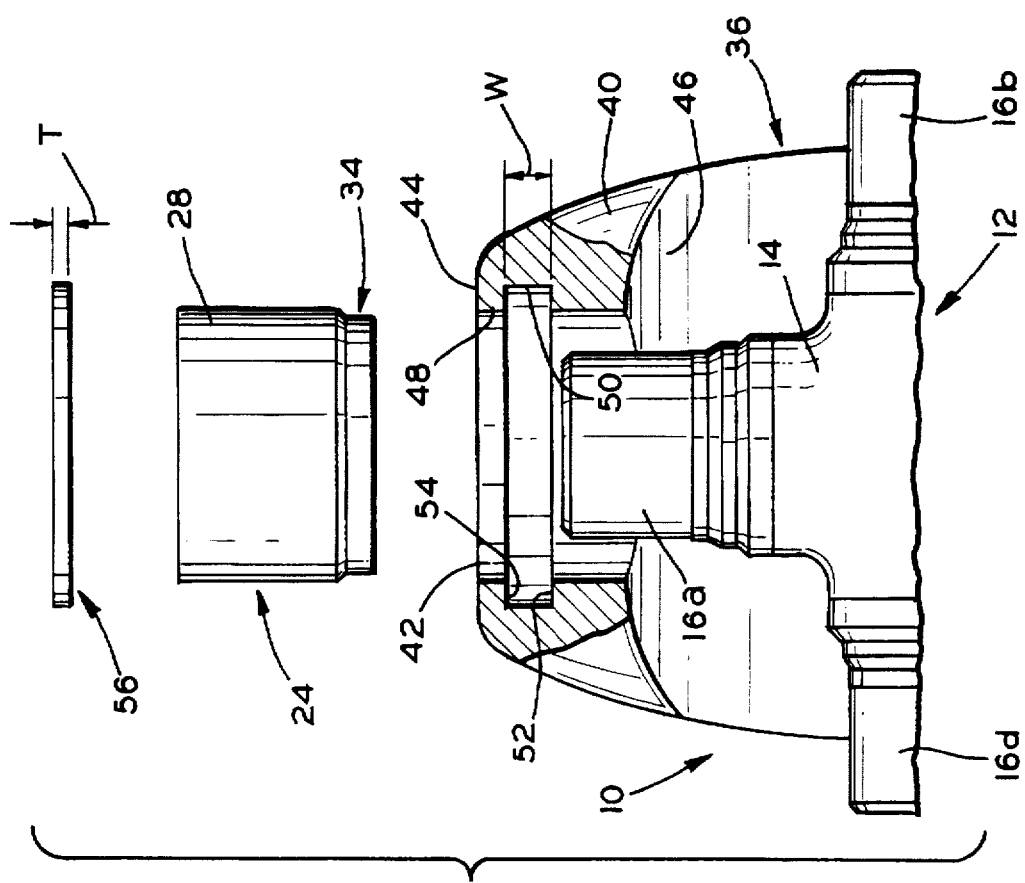
FIG. 2 is an enlarged exploded view, partly in section, of one bearing cup and snap ring of FIG. 1 prior to mounting on the cross member and illustrating the width of a groove for receiving the snap ring.
Figure 4:
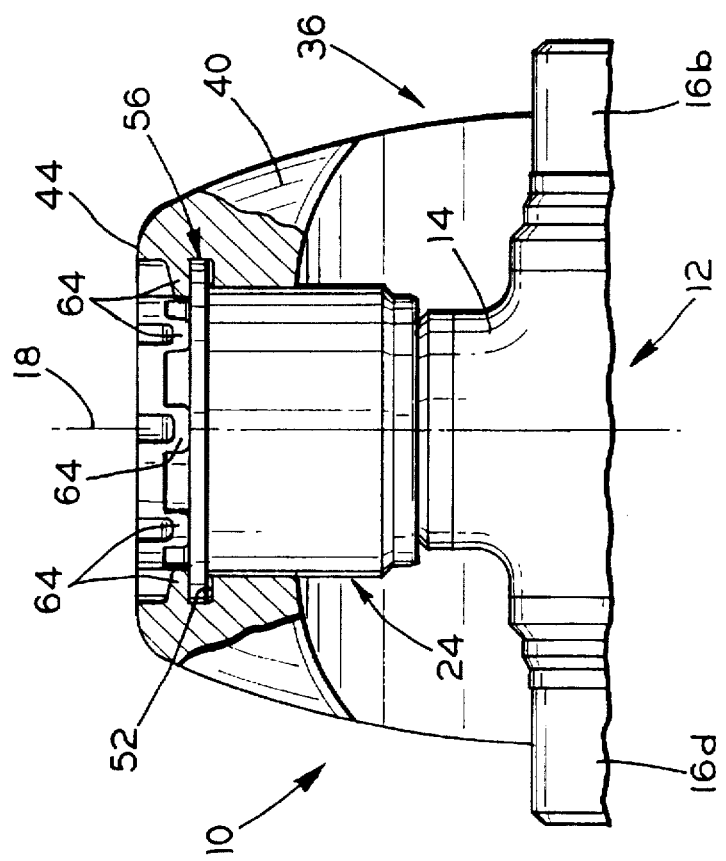
FIG. 4 is a view similar to FIG. 2 illustrating the bearing cap mounted on the cross member and the snap ring inserted into the groove.

The method of assembling the universal joint assembly 10 will now be described. As illustrated in FIG. 2, the cross member 12 is tilted and positioned so that the trunnions 16a and 16c are received in the cylindrical openings 42. Once the trunnions are in place, a bearing cup 24 is rotatably mounted on trunnions 16a and 16c by passing the bearing cups 24 through the cylindrical openings 42 in the arms 40 as illustrated in FIG. 4. A snap ring 56 is compressed and inserted into each groove 50.

A predetermined amount of travel of the cross member 12 with respect to the end yoke 36 is provided after the snap rings 56 have been inserted. The travel is specifically provided by selectively sizing the width W of the grooves and the thickness T of the snap rings. The width W of each groove 50 is greater than the thickness T of a snap ring 56. As stated above, the widths W of the grooves 50 are increased over prior art grooves by increasing the distance D a predetermined amount.

The cross member 12 is centered with respect to the end yoke 36 by aligning the center of gravity 22 of the cross member 12 with the end yoke axis 37 and securing the cross member 12 to the end yoke 36. The cross member 12 is moved and positioned along the trunnion axis 18 until the center of gravity 22 coincides with the end yoke axis 37. Once the cross member 12 is centered in this manner, means are provided to fix the position of the cross member with respect to the end yoke 36.

Figure 5:
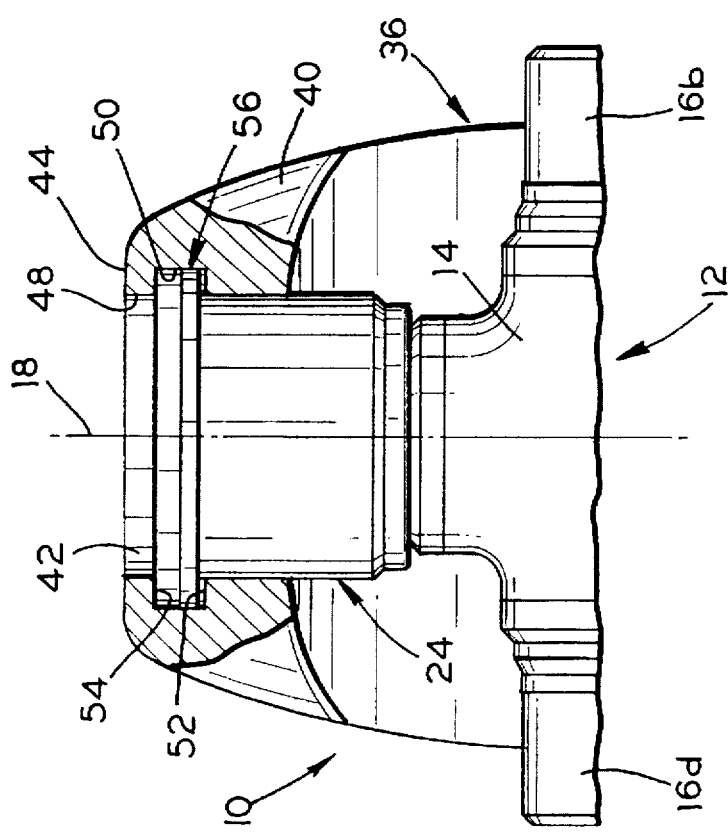
FIG. 5 is a view similar to FIG. 4 illustrating upset portions pressed against the snap ring after a staking operation, thereby positively locating the cross member with respect to the end yoke.

As illustrated in FIG. 5, portions of the arms 40 surrounding the cylindrical openings 42 are deformed in a generally radially inwardly direction to form upset portions 64 pressed against the snap rings 56 during a staking operation. The upset portions 64 form an outer boundary for the snap ring 56 radially inwardly from the outer wall 54 of the groove 50. Thus, after the staking operation at each cylindrical opening 42, the cross member 12 is fixed relative to the end yoke 36, thereby eliminating the travel provided by the groove 50 prior to staking. By aligning the center of gravity 22 of the cross member 12 with the end yoke axis 37, the universal joint assembly 10 has improved balance over prior art universal joint assemblies.

The staking operation to form the upset portions 64 can be performed by any suitable means, including a tool (not illustrated) pressing radially inwardly from the outer arm surfaces 44 toward the cross member 12. The universal joint assembly 10 may be held in a fixture (not illustrated) to align the center of gravity of the cross and perform the staking operation. If the upset portions 64 were to fail and break away from cylindrical surface 48 during use, the bearing cup 24 would continue to be retained on a respective trunnion by the snap ring 56.

Once the centering and staking operation has been completed for the cross member 12 along the first trunnion axis 18, a similar operation can be performed along the second trunnion axis 20. Trunnions 16b and 16d can be received in cylindrical openings of a second end yoke or similar coupling (not illustrated) to connect the universal joint assembly 10 to a driveshaft component (not illustrated). Bearing cups are mounted onto trunnions 16b and 16d and snap rings can be inserted into receiving grooves to retain the bearing cups. The cross member 12 is positioned along second trunnion axis 20 until the center of gravity 22 of the cross member 12 is aligned with axis of the second end yoke. Once centered, the cross member 12 can be fixed with respect to the second end yoke by staking the snap rings in place in a manner similar to the operation described above.

Once centered and staked, the universal joint assembly 10 provides improved balance over prior universal joints. The mass components of the present universal joint assembly 10 are more closely centered with respect to the rotational axis of a driveshaft, thereby minimizing balancing time of such a drive shaft.

In accordance with the provisions of the patent statutes, the principle and mode of operation of this invention have been explained and illustrated in its preferred embodiment. However, it must be understood that this invention may be practiced otherwise than as specifically explained and illustrated without departing from its spirit or scope. For example, the preferred embodiment has been described with reference to an end yoke. The present method and assembly can be used to center a cross in any yoke having a pair of opposed arms, such as a slip yoke.

What is claimed is:

1. A method of assembling a universal joint assembly comprising the steps of:

providing a yoke including an arm having an opening formed therethrough, said opening having a groove formed therein including a wall;

providing a cross including a body having a trunnion extending therefrom;

positioning said cross relative to said yoke such that said trunnion is received within said opening of said arm;

mounting a bearing cup on said trunnion within said opening at a predetermined position relative to said arm, said bearing cup being located a predetermined distance from said wall of said groove;

installing a ring in said groove, said ring defining a thickness that is smaller than said predetermined distance so as to be movable in said groove relative to said bearing cup and said arm; and fixing said ring in position relative to said arm so as to abut said bearing cup and thereby maintain said bearing cup at said predetermined position relative to said arm.

2. The method defined in claim 1 wherein said step of positioning said cross relative to said yoke aligns a rotational axis of said cross with a rotational axis of said yoke.

3. The method defined in claim 1 wherein said step of positioning said cross relative to said yoke aligns a center of gravity of said cross with a rotational axis of said yoke.

4. The method defined in claim 1 wherein said step of installing a ring in said groove is performed by installing a snap ring within said groove.

5. The method defined in claim 1 wherein said step of fixing said ring in position relative to said arm is performed by staking a portion of said arm against said ring.

6. The method defined in claim 1 wherein said step of fixing said ring in position relative to said arm is performed by staking portions of said arm against said ring.

7. A method of assembling a universal joint assembly comprising the steps of:

providing a yoke including a pair of arms having respective openings formed therethrough, each of said openings having a groove formed therein including a wall;

providing a cross including a body having a pair of trunnions extending therefrom;

positioning said cross relative to said yoke such that said trunnions are respectively received within said openings of said arms;

mounting a bearing cup on each of said trunnions within said openings at predetermined positions relative to each of said arms, said bearing cups being located predetermined distances from said respective walls of said grooves;

installing a ring in each of said grooves, each of said rings defining a thickness that is smaller than said predetermined distances so as to be movable in said grooves relative to said bearing cups and said arms; and fixing said rings in position relative to said arms so as to abut said bearing cups and thereby maintain said bearing cups at said predetermined positions relative to said arms.

8. The method defined in claim 7 wherein said step of positioning said cross relative to said yoke aligns a rotational axis of said cross with a rotational axis of said yoke.

9. The method defined in claim 7 wherein said step of positioning said cross relative to said yoke aligns a center of gravity of said cross with a rotational axis of said yoke.

10. The method defined in claim 7 wherein said step of installing a ring in each of said grooves is performed by installing a snap ring within each of said grooves.

11. The method defined in claim 7 wherein said step of fixing said rings in position relative to said arms is performed by staking a portion of each of said arms against said rings.

12. The method defined in claim 7 wherein said step of fixing said rings in position relative to said arms is performed by staking portions of each of said arms against said rings.

13. A universal joint assembly comprising:

a yoke including an arm having an opening formed therethrough, said opening having a groove formed therein including a wall;

a cross including a body having a trunnion extending therefrom that is received within said opening of said arm;

a bearing cup mounted on said trunnion within said opening at a predetermined position relative to said arm and located a predetermined distance from said wall of said groove;

a ring disposed within said groove, said ring defining a thickness that is smaller than said predetermined distance; and a staked portion formed on said arm of said yoke fixing said ring in position relative to said arm so as to abut said bearing cup and thereby maintain said bearing cup at said predetermined position relative to said arm.

14. The universal joint assembly defined in claim 13 wherein a rotational axis of said cross is aligned with a rotational axis of said yoke.

15. The universal joint assembly defined in claim 13 wherein a center of gravity of said cross is aligned with a rotational axis of said yoke.

16. The universal joint assembly defined in claim 13 wherein said ring is a snap ring.

17. The universal joint assembly defined in claim 13 wherein a plurality of staked portions are formed on said arm of said yoke fixing said ring in position relative to said arm so as to abut said bearing cup and thereby maintain said bearing cup at said predetermined position relative to said arm.

18. The universal joint assembly defined in claim 13 wherein said yoke includes a pair of arms having respective openings formed therethrough, each of said opening having a groove formed therein including a wall;

said cross includes a body having a pair of trunnions extending therefrom that are respectively received within said openings of said arms;

a bearing cup is mounted on each of said trunnions within said openings at predetermined positions relative to said arms and located predetermined distances from said walls of said grooves;

a ring is disposed within each of said grooves, said rings defining respective thicknesses that are smaller than said predetermined distances; and a staked portion formed on each of said arms of said yoke fixing said rings in position relative to said arms so as to abut said bearing cups and thereby maintain said bearing cups at said predetermined positions relative to said arm.

* * * * *